J. E. O. FELLER.
AUTOMOBILE LOCKING DEVICE.
APPLICATION FILED MAR. 11, 1919.

1,359,883.

Patented Nov. 23, 1920.

INVENTOR
John E. O. Feller.

ATTORNEYS.

UNITED STATES PATENT OFFICE.

JOHN E. O. FELLER, OF CANTON, OHIO.

AUTOMOBILE-LOCKING DEVICE.

1,359,883. Specification of Letters Patent. Patented Nov. 23, 1920.

Application filed March 11, 1919. Serial No. 282,011.

*To all whom it may concern:*

Be it known that I, JOHN E. O. FELLER, a citizen of the United States, residing at Canton, in the county of Stark and State of Ohio, have invented certain new and useful Improvements in Automobile-Locking Devices, of which the following is a specification.

This invention relates to automobile locking devices and has more especial reference to a device arranged to be placed upon the gear shift lever locking the same in a neutral position.

The object of the invention is to provide a device which may be easily placed upon the gear shift lever when the same is in the neutral position, and to which a padlock may be applied to hold the gear shift lever in this position.

A further object is the provision of a device of this character which is simple and inexpensive to manufacture, durable in construction and efficient in operation.

With these objects in view the invention consists in the novel construction and arrangement of parts, hereinafter described, illustrated in the accompanying drawings, and particularly pointed out in the appended claim, it being understood that various changes in the form, proportions, size and minor details of construction may be made within the scope of the appended claim, without departing from the spirit or sacrificing any of the advantages of the invention.

The invention thus set forth in general terms is illustrated in the accompanying drawings forming part hereof, in which—

Figure 1:
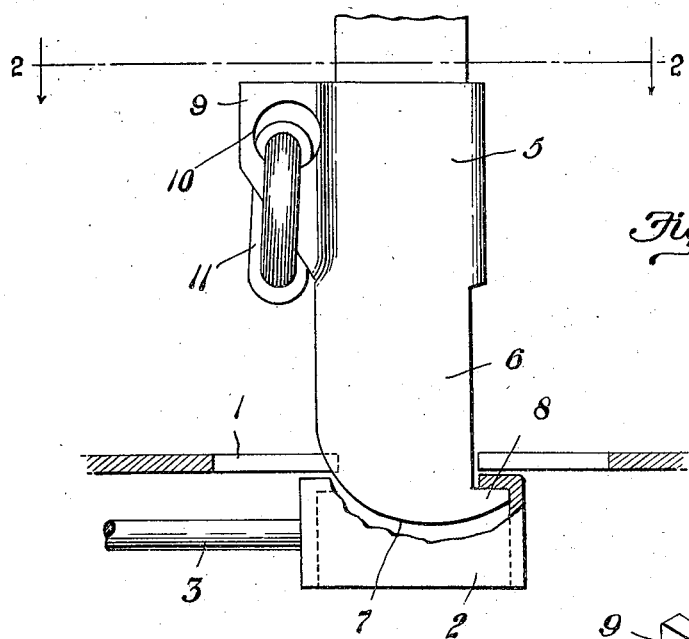
Figure 2:
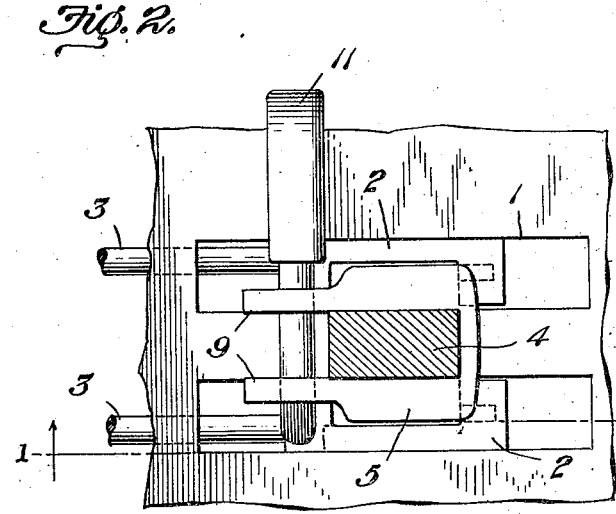
Figure 3:
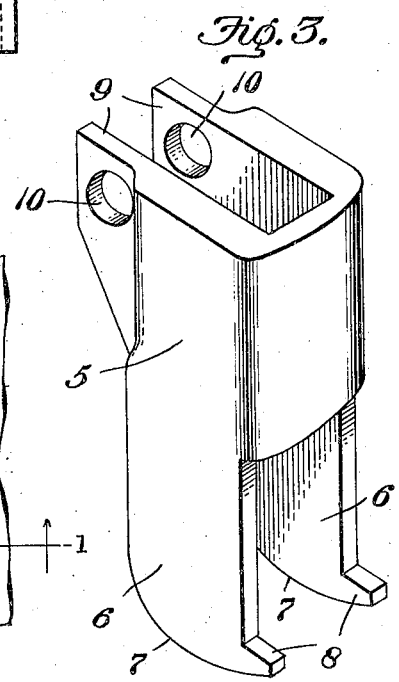

Figure 1 is a section on the line 1—1, Fig. 2;

Fig. 2, a section on the line 2—2, Fig. 1;

Fig. 3, a perspective view of the device; and

Figure 4:
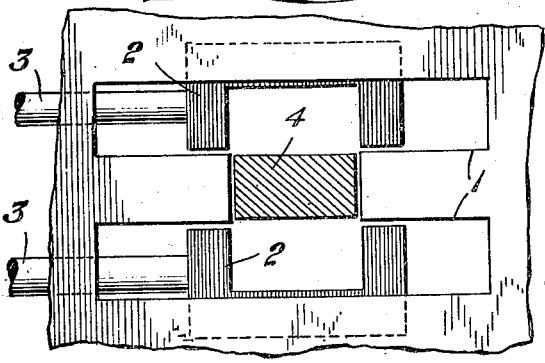

Fig. 4, a view similar to Fig. 2 with the locking device removed.

A practical embodiment of the invention is disclosed in the accompanying drawings, forming a part of this specification in which similar numerals of reference indicate corresponding parts throughout the several views.

The device is designed for use upon cars wherein the gear shift lever operates within an H-shaped slot, such as is best shown in Fig. 4, at 1. A channel member 2 is usually located beneath each leg of the slot and connected by the usual rod 3 to the gearing. Each of these channel members is adapted to receive the gear shift lever shown in cross section at 4 and by moving the lever forward and backward in either leg of the slot, the channel member is moved therewith and through the rods 3, the gears are shifted to the high, low, intermediate or reverse, as desired. When the lever is disengaged from both of the channel members and moved into the position shown in Fig. 4 the gears are left in the neutral position. The present invention pertains to a device arranged to lock the gear shift lever and the channel members through which the gears are operated in the neutral position.

The device comprises the channel portion 5, the sides of which are extended downwardly as shown at 6 forming a pair of spaced plates preferably rounded toward the rear at their under edge as shown at 7 projections 8 being formed at the forward lower corner of each plate.

A pair of spaced ears 9 extends rearwardly from the channel portion 5 of the device, apertures 10 being formed through said ears for the purpose of receiving the shackle of the padlock 11.

When the owner desires to leave his car standing upon the street the gear shift lever is first moved to the neutral position, shown in Figs. 2 and 4 and the locking device applied by tilting the lower portion of the same toward the gear shift lever and at the same time inserting the projections 8 beneath the flanges of the channel members 2, one leg or plate 6 being located upon each side of the gear shift lever. The device is then moved into a substantially vertical position as shown in Figs. 1 and 2, the channel portion 5 thereof receiving the gear shift lever and the shackle of the padlock 11 is placed through the apertures 10. The lever is thus locked in the neutral position and the gear shifting rods held against movement. The gears being held in the neutral position it will be impossible to operate the car until the pad lock is opened and the device removed.

I claim—

In combination with a gear shift comprising an H-shaped slot, a lever slidable within the slot and channel members below the slot, a locking device comprising a channel portion to receive the lever, reduced side portions extending into the slot, projections on said side portions for engagement with the channel members and the lower ends of said side portions being curved to rest upon said channel members ears on the channel portion provided with apertures for the reception of a lock shackle.

In testimony that I claim the above, I have hereunto subscribed my name.

JOHN E. O. FELLER.